(12) United States Patent
Yadin et al.

(10) Patent No.: US 11,221,500 B2
(45) Date of Patent: Jan. 11, 2022

(54) LIQUID CRYSTAL LENS WITH ENHANCED ELECTRICAL DRIVE

(71) Applicant: Optica Amuka (A.A.) Ltd., Petach Tikva (IL)

(72) Inventors: Yoav Yadin, Ganey Tikva (IL); Yariv Haddad, Raanana (IL); Shamir Rosen, Ramat Gan (IL); Itamar Haim Grutman, Mazkeret Batya (IL); Yuval Vardy, Tel Aviv (IL)

(73) Assignee: OPTICA AMUKA (A.A.) LTD., Petach Tikva (IL)

( * ) Notice: Subject to any disclaimer, the term of this patent is extended or adjusted under 35 U.S.C. 154(b) by 368 days.

(21) Appl. No.: 16/081,927

(22) PCT Filed: Apr. 5, 2017

(86) PCT No.: PCT/IB2017/051943
§ 371 (c)(1),
(2) Date: Sep. 3, 2018

(87) PCT Pub. No.: WO2017/182906
PCT Pub. Date: Oct. 26, 2017

(65) Prior Publication Data
US 2020/0292848 A1 Sep. 17, 2020

Related U.S. Application Data

(60) Provisional application No. 62/323,708, filed on Apr. 17, 2016, provisional application No. 62/330,265, (Continued)

(51) Int. Cl.
*G02B 1/06* (2006.01)
*G03H 1/02* (2006.01)
(Continued)

(52) U.S. Cl.
CPC .............. *G02C 7/085* (2013.01); *G02B 3/14* (2013.01); *G02F 1/1306* (2013.01)

(58) Field of Classification Search
CPC ........ G02F 2/07; G02F 1/1521; G02F 1/0356; G02B 27/0172; G02B 3/14; G02B 1/07;
(Continued)

(56) References Cited

U.S. PATENT DOCUMENTS 3,580,661 A    5/1971   Cooper, Jr. et al.
3,881,921 A    5/1975   Frank
(Continued)

FOREIGN PATENT DOCUMENTS

CN    201752480 U    3/2011
CN    102253563 A    11/2011
(Continued)

OTHER PUBLICATIONS

JP Application # 2016-555831 office action dated Oct. 30, 2018.
(Continued)

*Primary Examiner* — Dawayne Pinkney
(74) *Attorney, Agent, or Firm* — Kligler & Associates Patent Attorneys Ltd

(57) ABSTRACT

An optical device (40) includes an electro-optical layer (46), having an effective local index of refraction at any given location within an active area of the electro-optical layer that is determined by a voltage waveform applied across the electro-optical layer at the location. Conductive electrodes (50, 52) are disposed over opposing first and second side of the electro-optical layer. Control circuitry (26) is configured to apply control voltage waveforms between the conductive electrodes so as to generate a phase modulation profile in the electro-optical layer that causes rays of optical radiation that are incident on the device to converge or diverge with a given focal power, while varying an amplitude of the control
(Continued)

voltage waveforms for the given focal power responsively to an angle of incidence of the rays that impinge on the device from a direction of interest.

31 Claims, 7 Drawing Sheets

Related U.S. Application Data filed on May 2, 2016, provisional application No. 62/350,723, filed on Jun. 16, 2016, provisional application No. 62/394,770, filed on Sep. 15, 2016.

(51) Int. Cl.
| | |
|---|---|
| *G02F 1/03* | (2006.01) |
| *G02F 1/153* | (2006.01) |
| *G02F 1/00* | (2006.01) |
| *G02C 5/00* | (2006.01) |
| *G02C 7/02* | (2006.01) |
| *G02C 7/00* | (2006.01) |
| *G02C 3/00* | (2006.01) |
| *G02F 1/1335* | (2006.01) |
| *G02C 7/08* | (2006.01) |
| *G02B 3/14* | (2006.01) |
| *G02F 1/13* | (2006.01) |

(58) Field of Classification Search
CPC .......... G02B 27/0103; B29D 11/00826; G03H 1/02; G02C 7/101; G02C 5/00; G02C 7/02; G02C 7/04; G02C 7/08; G02C 7/049
USPC ............. 359/665–666, 253, 272, 13, 7, 322; 351/41, 159.01–159.03, 159.39, 159.4, 351/159.67, 159.74–159.76; 349/11, 13
See application file for complete search history.

(56) References Cited

U.S. PATENT DOCUMENTS

| | | | |
|---|---|---|---|
| 4,190,330 | A | 2/1980 | Berreman et al. |
| 4,300,818 | A | 11/1981 | Schachar |
| 4,584,592 | A | 4/1986 | Tuan et al. |
| 4,853,764 | A | 8/1989 | Sutter |
| 5,073,021 | A | 12/1991 | Marron |
| 5,212,583 | A | 5/1993 | Vali et al. |
| 5,359,444 | A | 10/1994 | Piosenka et al. |
| 5,757,546 | A | 5/1998 | Lipton et al. |
| 5,815,233 | A | 9/1998 | Morokawa et al. |
| 5,861,936 | A | 1/1999 | Sorensen |
| 5,861,940 | A | 1/1999 | Robinson et al. |
| 6,152,563 | A | 11/2000 | Hutchinson et al. |
| 6,243,063 | B1 | 6/2001 | Mayhew et al. |
| 6,501,443 | B1 | 12/2002 | McMahon |
| 6,517,203 | B1 | 2/2003 | Blum et al. |
| 6,553,504 | B1 | 4/2003 | Katzenelson et al. |
| 6,857,741 | B2 | 2/2005 | Blum et al. |
| 6,986,579 | B2 | 1/2006 | Blum et al. |
| 7,475,984 | B2 | 1/2009 | Blum et al. |
| 7,475,985 | B2 | 1/2009 | Blum et al. |
| 7,497,121 | B2 | 3/2009 | Okuda et al. |
| 7,517,083 | B2 | 4/2009 | Blum et al. |
| 7,600,872 | B2 | 10/2009 | Esser et al. |
| 7,728,949 | B2 | 6/2010 | Clarke et al. |
| 8,052,278 | B2 | 11/2011 | Bovet et al. |
| 8,675,148 | B2 | 3/2014 | Takagi et al. |
| 8,773,629 | B2 | 7/2014 | Uehara et al. |
| 8,896,772 | B2 | 11/2014 | Fraval et al. |
| 8,922,902 | B2 | 12/2014 | Blum et al. |
| 9,052,514 | B2 | 6/2015 | Takama |
| 9,241,669 | B2 | 1/2016 | Pugh et al. |
| 9,304,319 | B2 | 4/2016 | Bar-Zeev et al. |
| 9,541,774 | B2 | 1/2017 | Machida et al. |
| 9,958,703 | B2 | 5/2018 | Pugh et al. |
| 10,268,050 | B2 | 4/2019 | To et al. |
| 2002/0044125 | A1 | 4/2002 | Maltese |
| 2003/0128416 | A1 | 7/2003 | Caracci et al. |
| 2003/0210377 | A1 | 11/2003 | Blum et al. |
| 2003/0231293 | A1 | 12/2003 | Blum et al. |
| 2004/0041745 | A1 | 3/2004 | Chen |
| 2004/0160389 | A1 | 8/2004 | Suyama |
| 2004/0169630 | A1 | 9/2004 | Ide |
| 2005/0146495 | A1 | 7/2005 | MacKinnon et al. |
| 2005/0162367 | A1 | 7/2005 | Kobayashi et al. |
| 2005/0168430 | A1 | 8/2005 | Nishimura et al. |
| 2006/0034003 | A1 | 2/2006 | Zalevsky |
| 2006/0092340 | A1 | 5/2006 | Blum et al. |
| 2006/0126698 | A1 | 6/2006 | Blum et al. |
| 2006/0164593 | A1 | 7/2006 | Peyghambarian et al. |
| 2006/0164687 | A1 | 7/2006 | Huang et al. |
| 2007/0052876 | A1 | 3/2007 | Kaufman et al. |
| 2007/0146873 | A1 | 6/2007 | Ortyn et al. |
| 2007/0236769 | A1 | 10/2007 | Zalevsky |
| 2007/0236800 | A1 | 10/2007 | Cakmakci et al. |
| 2007/0280626 | A1 | 12/2007 | Haddock et al. |
| 2007/0290972 | A1 | 12/2007 | Meredith |
| 2009/0237575 | A1 | 9/2009 | Tsi-shi |
| 2009/0279050 | A1 | 11/2009 | McGinn et al. |
| 2010/0007804 | A1 | 1/2010 | Guncer |
| 2010/0026920 | A1 | 2/2010 | Kim et al. |
| 2010/0149444 | A1 | 6/2010 | Hikmet et al. |
| 2010/0157181 | A1 | 6/2010 | Takahashi |
| 2011/0018903 | A1 | 1/2011 | Lapstun et al. |
| 2011/0037837 | A1 | 2/2011 | Chiba et al. |
| 2011/0228181 | A1 | 9/2011 | Jeong et al. |
| 2011/0234934 | A1 | 9/2011 | Chang |
| 2011/0317128 | A1 | 12/2011 | Guilloux et al. |
| 2012/0099040 | A1 | 4/2012 | Robinson et al. |
| 2012/0120333 | A1 | 5/2012 | Chen et al. |
| 2012/0133891 | A1 | 5/2012 | Jiang |
| 2012/0147038 | A1 | 6/2012 | Perez et al. |
| 2012/0194781 | A1 | 8/2012 | Agurok |
| 2012/0212696 | A1 | 8/2012 | Trajikovska et al. |
| 2012/0300171 | A1 | 11/2012 | Gupta et al. |
| 2013/0027655 | A1 | 1/2013 | Blum et al. |
| 2013/0208224 | A1 | 8/2013 | Kizu et al. |
| 2013/2008224 | | 8/2013 | Kizu et al. |
| 2013/0250193 | A1 | 9/2013 | Yun et al. |
| 2013/0250223 | A1 | 9/2013 | Takagi et al. |
| 2014/0036172 | A1 | 2/2014 | Trajkovska-Broach et al. |
| 2014/0036183 | A1 | 2/2014 | Asatryan et al. |
| 2014/0118644 | A1 | 5/2014 | Liu et al. |
| 2014/0347405 | A1 | 11/2014 | Kumeta et al. |
| 2015/0116304 | A1 | 4/2015 | Lee et al. |
| 2015/0185503 | A1 | 7/2015 | Tate et al. |
| 2015/0219893 | A1 | 8/2015 | Chen et al. |
| 2015/0277151 | A1 | 10/2015 | Yadin et al. |
| 2015/0378240 | A1 | 12/2015 | Wang et al. |
| 2016/0004128 | A1 | 1/2016 | Wu |
| 2016/0161767 | A1 | 6/2016 | Childers |
| 2017/0068134 | A1 | 3/2017 | Yadin et al. |
| 2017/0160440 | A1 | 6/2017 | Yadin et al. |
| 2017/0160518 | A1 | 6/2017 | Lanman et al. |
| 2017/0184848 | A1 | 6/2017 | Vallius |
| 2017/0219828 | A1 | 8/2017 | Tsai et al. |
| 2017/0269453 | A1 | 9/2017 | Galstian et al. |
| 2017/0276963 | A1 | 9/2017 | Brennan et al. |

FOREIGN PATENT DOCUMENTS

| | | | |
|---|---|---|---|
| EP | 0595705 | A1 | 5/1994 |
| EP | 1050775 | A1 | 11/2000 |
| EP | 1760515 | A2 | 3/2007 |
| EP | 2309310 | A1 | 4/2011 |
| EP | 2503787 | A1 | 9/2012 |
| EP | 2682810 | A1 | 1/2014 |
| JP | S62209412 | A | 9/1987 |
| JP | H0289017 | A | 3/1990 |
| JP | H036518 | A | 1/1991 |
| JP | 2003091013 | A | 3/2003 |
| JP | 2011203457 | A | 10/2011 |
| JP | 2012141552 | A | 7/2012 |

(56) References Cited

FOREIGN PATENT DOCUMENTS

| WO | 8102795 | A1 | 10/1981 | | |
|---|---|---|---|---|---|
| WO | 9941639 | A1 | 8/1999 | | |
| WO | 03077012 | A2 | 9/2003 | | |
| WO | 2008032061 | A2 | 3/2008 | | |
| WO | 2011075834 | A1 | 6/2011 | | |
| WO | 2012120470 | A1 | 9/2012 | | |
| WO | WO-2014049577 | A1 * | 4/2014 | ....... | G02F 1/134336 |
| WO | 2014063432 | A1 | 5/2014 | | |
| WO | WO-2015136458 | A1 * | 9/2015 | ............... | G02F 1/29 |
| WO | 2017003330 | A1 | 1/2017 | | |
| WO | 2017158486 | A1 | 9/2017 | | |

OTHER PUBLICATIONS

U.S. Appl. No. 15/310,798 office action dated Oct. 4, 2018.
JP Application # 2016-569044 office action dated Oct. 3, 2018.
International Application # PCT/IB2018/054957 Search Report dated Nov. 28, 2018.
European Application # 17785529.3 search report dated Oct. 4, 2019.
International Application # PCT/IB2020/054524 Search Report dated Aug. 31, 2020.
U.S. Appl. No. 16/085,581 Office Action dated Nov. 3, 2020.
EP Application # 20199016.5 Search Report dated Nov. 30, 2020.
U.S. Appl. No. 15/310,798 office action dated Apr. 5, 2019.
EP Application # 15761611.1 office action dated May 28, 2019.
JP Application # 2016-569044 office action dated Apr. 24, 2019.
International Application # PCT/IB2019/056243 Search report dated Nov. 3, 2019.
Sensomotoric Instruments GmbH, "SMI Eye Tracking Glasses—Discover What is Seen", 2 pages, 2011.
Lensvector, "Breakthrough Autofocus Technology", 1 page, 2010.
Loktev et al., "Wave front control systems based on modal liquid crystal lenses", Review of Scientific Instruments, vol. 71, No. 9, pp. 3290-3297, Sep. 1, 2000.
Pixeloptics Inc., "The Evolution of Technology—emPower!—The world's First Electronic Focusing Eyewear", 1 page, 2009.
Brunosan., "Headaches in 3D", Saepe cadendo, 4 pages, Jan. 29, 2011.
Naumov et al., "Liquid-crystal adaptive lenses with modal control", Optics Letters, vol. 23, No. 13, pp. 992-994, Jul. 1, 1998.
Varioptic SA, "Liquid Lens for Auto Focus (AF)", 3 pages, Jul. 31, 2012.
Bagwell et al., "Liquid crystal based active optics", SPIE Proceedings Novel Optical Systems Design and Optimization IX, vol. 6289, 12 pages, Sep. 5, 2006.
Holoeye Photonics AG, "LC 2002: Translucent Spatial Light Modulator", 2 pages, May 12, 2012.
Varioptic SA, "The Liquid Lens Technology", 2 pages, Dec. 2, 2010.
Longtech Optics Co Ltd., "LCD Multiplex Ratio", 1 page, year 2008.
Stiefelhagen et al., "A Model-Based Gaze Tracking System", International Journal of Artificial Intelligence Tools, vol. 6, No. 2, pp. 193-209, year 1997.
Baluja et al., "Non-Intrusive Gaze Tracking Using Artificial Neural Networks", CMU Technical Report, CMU-CS-94-102; 14 pages, Jan. 5, 1994.
Jacob, R., "The Use Of Eye Movements In Human-Computer Interaction Techniques: What You Look At Is What You Get", ACM Transactions On Information Systems, vol. 9, No. 3, pp. 152-169, Apr. 1991.
Heinzmann et al., "3-D Facial Pose And Gaze Point Estimation Using A Robust Real-Time Tracking Paradigm", Proceedings of the Third International Conference on Automatic Face and Gesture Recognition, pp. 142-147, Apr. 14-16, 1998.
Wang et al., "Liquid crystal blazed grating beam deflector", Part of the SPIE Conference on Advanced OpticalMemories and Interfaces to Comouter Storage, San Diego, USA, vol. 3468, pp. 43-54, Jul. 1998.
Goodman, "Introduction to Fourier Optics", 3rd edition, published by Roberts & Company, year 2005.
Boulder Nonlinear Systems, "Spatial Light Modulators—XY Phase Series", 1 page, 2007.
Boulder Nonlinear Systems, "Spatial Light Modulators—XY Phase Series—draft Specifications", 1 page, 2007.
Holmarc Opto-Mechantronics PVT. Ltd., "Lab Equipment for Research and Manufacturing", 24 pages (relevant p. 18 "Bench Top Rubbing Machine"), Jan. 23, 2015.
International Application # PCT/IB2018/057841 search report dated Jan. 15, 2019.
EP Application # 18213190.4 search report dated Feb. 14, 2019.
EP Application # 15761611.1 office action dated Feb. 13, 2019.
Indian Application #1664/CHENP/2015 Office Action dated Jan. 29, 2019.
CA Application # 2,947,809 Office Action dated Apr. 19, 2021.
CA Application # 2,939,664 Office Action dated Apr. 20, 2021.
U.S. Appl. No. 16/085,581 Office Action dated May 7, 2021.
U.S. Appl. No. 16/566,910 Office Action dated Jun. 24, 2021.
EP Application # 18869416 Search Report dated Jun. 16, 2021.
U.S. Appl. No. 16/085,581 Office Action dated Sep. 20, 2021.
EP Application # 21202537.3 Search Report dated Nov. 4, 2021.

* cited by examiner

LIQUID CRYSTAL LENS WITH ENHANCED ELECTRICAL DRIVE

CROSS-REFERENCE TO RELATED APPLICATION

This application claims the benefit of U.S. Provisional Patent Application 62/323,708, filed Apr. 17, 2016; U.S. Provisional Patent Application 62/330,265, filed May 2, 2016; U.S. Provisional Patent Application 62/350,723, filed Jun. 16, 2016; and U.S. Provisional Patent Application 62/394,770, filed Sep. 15, 2016. The disclosures of all of these related applications are incorporated herein by reference.

FIELD OF THE INVENTION

The present invention relates generally to optical devices, and particularly to electrically-tunable lenses.

BACKGROUND

Tunable lenses are optical elements whose optical characteristics, such as the focal length and/or the location of the optical axis, can be adjusted during use, typically under electronic control. Such lenses may be used in a wide variety of applications. For example, U.S. Pat. No. 7,475,985 describes the use of an electro-active lens for the purpose of vision correction.

Electrically-tunable lenses typically contain a thin layer of a suitable electro-optical material, i.e., a material whose local effective index of refraction changes as a function of the voltage applied across the material. An electrode or array of electrodes is used to apply the desired voltages in order to locally adjust the refractive index to the desired value. Liquid crystals are the electro-optical material that is most commonly used for this purpose (wherein the applied voltage rotates the molecules, which changes the axis of birefringence and thus changes the effective refractive index); but other materials, such as polymer gels, with similar electro-optical properties can alternatively be used for this purpose.

Some tunable lens designs use an electrode array to define a grid of pixels in the liquid crystal, similar to the sort of pixel grid used in liquid-crystal displays. The refractive indices of the individual pixels may be electrically controlled to give a desired phase modulation profile. (The term "phase modulation profile" is used in the present description and in the claims to mean the distribution of the local phase shifts that are applied to light passing through the layer as the result of the locally-variable effective refractive index over the area of the electro-optical layer of the tunable lens.) Lenses using grid arrays of this sort are described, for example, in the above-mentioned U.S. Pat. No. 7,475,985.

PCT International Publication WO 2014/049577, whose disclosure is incorporated herein by reference, describes an optical device comprising an electro-optical layer, having an effective local index of refraction at any given location within an active area of the electro-optical layer that is determined by a voltage waveform applied across the electro-optical layer at the location. An array of excitation electrodes, including parallel conductive stripes extending over the active area, is disposed over one or both sides of the electro-optical layer. Control circuitry applies respective control voltage waveforms to the excitation electrodes and is configured to concurrently modify the respective control voltage waveforms applied to excitation electrodes so as to generate a specified phase modulation profile in the electro-optical layer.

U.S. Patent Application Publication 2012/0133891 describes an electro-optical apparatus and method for correcting myopia that includes at least one adaptive lens, a power source, and an eye tracker. The eye tracker includes an image sensor and a processor operatively connected to the adaptive lens and the image sensor. The processor is configured to receive electrical signals from the image sensor and to control the correction power of the adaptive lens to correct myopia, with the correction power dependent on a user's gaze distance and myopia prescription strength.

As another example, U.S. Patent Application Publication 2012/0120333 described a liquid crystal lens, a controlling method thereof and a 3-Dimensional (3D) display using the same. The liquid crystal lens includes a pair of electrode structures, which are arranged apart from each other, and a liquid crystal layer, which is arranged between the pair of electrode structures and includes a plurality of liquid crystal molecules aligned in an initial aligning direction in which the liquid crystal layer has a non-lens effect. The pair of electrode structures are arranged to generate a first electric field, which is used to change aligning directions of the liquid crystal molecules to make the liquid crystal layer have a lens effect. The pair of electrode structures are further arranged to generate a second electric field, which is used to make the liquid crystal molecules revert to the initial aligning direction.

PCT International Publication WO 2015/186010, whose disclosure is incorporated herein by reference, describes adaptive spectacles, which include a spectacle frame and first and second electrically-tunable lenses, mounted in the spectacle frame. In one embodiment, control circuitry is configured to receive an input indicative of a distance from an eye of a person wearing the spectacles to an object viewed by the person, and to tune the first and second lenses in response to the input.

SUMMARY

Embodiments of the present invention that are described hereinbelow provide improved electrically-tunable optical devices.

There is therefore provided, in accordance with an embodiment of the invention, an optical device, including an electro-optical layer, having an effective local index of refraction at any given location within an active area of the electro-optical layer that is determined by a voltage waveform applied across the electro-optical layer at the location. Conductive electrodes are disposed over opposing first and second side of the electro-optical layer. Control circuitry is configured to apply control voltage waveforms between the conductive electrodes so as to generate a phase modulation profile in the electro-optical layer that causes rays of optical radiation that are incident on the device to converge or diverge with a given focal power, while varying an amplitude of the control voltage waveforms for the given focal power responsively to an angle of incidence of the rays that impinge on the device from a direction of interest.

In some embodiments, the electro-optical layer includes a liquid crystal.

In a disclosed embodiment, the control circuitry is configured to apply a control voltage waveform at a predetermined amplitude in order to produce a given phase shift in the rays that are incident along a normal to the device, and to apply the control voltage waveform at a first amplitude, which is less than the predetermined amplitude, to produce the given phase shift in the rays that are incident at an acute angle to the device at a first azimuth, and to apply the control voltage waveform at a second amplitude, which is greater than the predetermined amplitude, to produce the given phase shift in the rays that are incident at the acute angle to the device at a second azimuth, which is opposite to the first azimuth.

Additionally or alternatively, the control circuitry is configured to vary the respective amplitudes of the control voltage waveforms over an area of the device responsively to a mapping of the angle of incidence of the rays over the area of the device. In some embodiments, the device is included in a spectacle lens, wherein the mapping is indicative of the angle at which the rays pass through the electro-optical layer to the eye at each point over the area of the device.

In a disclosed embodiment, the control circuitry is configured to change the device from a first focal power to a second focal power by concurrently applying overshoot control voltages to each of a plurality of the conductive electrodes for different, respective transition periods, followed by application of the control voltage waveforms corresponding to the second focal power.

There is also provided, in accordance with an embodiment of the invention, an optical device, including an electro-optical layer, having an effective local index of refraction at any given location within an active area of the electro-optical layer that is determined by a voltage waveform applied across the electro-optical layer at the location. Conductive electrodes are disposed over opposing first and second side of the electro-optical layer. Control circuitry is configured to apply at least first control voltage waveforms and second control voltage waveforms between the conductive electrodes so as to generate respective first and second phase modulation profiles in the electro-optical layer, which cause rays of optical radiation that are incident on the device to converge or diverge with respective first and second focal powers, and is configured to change from the first focal power to the second focal power by concurrently applying overshoot control voltages to each of a plurality of the conductive electrodes for different, respective transition periods, followed by application of the second control voltage waveforms.

In some embodiments, the transition periods include a plurality of time slots, and the overshoot control voltages applied to at least some of the plurality of the conductive electrodes include at least a first overshoot voltage applied during a first time slot and a second overshoot voltage applied during a second time slot.

Additionally or alternatively, the overshoot voltages applied to at least some of the plurality of the conductive electrodes include a predefined high voltage, which is applied to different ones of the conductive electrodes for different, respective periods within the transition periods.

Further additionally or alternatively, the control circuitry is further configured, upon changing from the first focal power to the second focal power, to concurrently apply undershoot control voltages to at least some of the conductive electrodes before application of the second control voltage waveforms. In one embodiment, when the second focal power is zero, the overshoot control voltages include a predefined high voltage, which is applied by the control circuitry to all of the conductive electrodes on the first side of the electro-optical layer, followed by application of a predefined low voltage in the second control voltage waveforms.

In a disclosed embodiment, the overshoot control voltages applied to at least one electrode among the plurality of the conductive electrodes depend both on the first and second control voltage waveforms that are applied to the at least one electrode and on the control voltage waveforms that are applied to one or more other conductive electrodes that are adjacent to the at least one electrode.

There is additionally provided, in accordance with an embodiment of the invention, an optical device, including an electro-optical layer, having an effective local index of refraction at any given location within an active area of the electro-optical layer that is determined by a voltage waveform applied across the electro-optical layer at the location. Conductive electrodes are disposed over opposing first and second side of the electro-optical layer. Control circuitry is configured to apply control voltage waveforms between the conductive electrodes so as to generate a phase modulation profile in the electro-optical layer that causes rays of optical radiation that are incident on the device to converge or diverge with a given focal power, and is configured to change from the given focal power to zero focal power by concurrently applying a predefined high voltage to all of the conductive electrodes on the first side of the electro-optical layer, followed by application of a predefined low voltage thereto.

There is further provided, in accordance with an embodiment of the invention, an optical device, including an electro-optical layer, having an effective local index of refraction at any given location within an active area of the electro-optical layer that is determined by a voltage waveform applied across the electro-optical layer at the location. Conductive electrodes are disposed over opposing first and second side of the electro-optical layer. Control circuitry is configured to apply at least first control voltage waveforms and second control voltage waveforms between the conductive electrodes so as to generate respective first and second phase modulation profiles in the electro-optical layer, which cause rays of optical radiation that are incident on the device to converge or diverge with respective first and second focal powers, and is configured to change from the first focal power to the second focal power by concurrently applying overshoot control voltages to each of a plurality of the conductive electrodes, followed by application of the second control voltage waveforms. The overshoot control voltages applied to at least one electrode among the plurality of the conductive electrodes depend both on the first and second control voltage waveforms that are applied to the at least one electrode and on the control voltage waveforms that are applied to one or more other conductive electrodes that are adjacent to the at least one electrode.

In a disclosed embodiment, the first and second phase modulation profiles include multiple Fresnel phase transitions, which are arranged so that the device operates as a Fresnel lens, and the overshoot control voltages are applied to the conductive electrodes in a vicinity of the Fresnel phase transitions with a dependence on the voltage waveforms that are applied to the adjacent conductive electrodes that differs from the overshoot control voltages applied to the conductive electrodes that are not in the vicinity of the Fresnel phase transitions.

There are moreover provided, in accordance with an embodiment of the invention, adaptive spectacles, including a spectacle frame and first and second electrically-tunable lenses, mounted in the spectacle frame and having respective focal powers and optical centers that are determined by voltage waveforms applied thereto. Control circuitry is configured to receive an input indicative of a distance from an eye of a person wearing the spectacles to an object viewed by the person, and responsively to the distance to modify the voltage waveforms so as both to tune the focal powers and to shift the optical centers of the electrically-tunable lenses.

In a disclosed embodiment, the control circuitry is configured to shift the optical centers of the first and second electrically-tunable lenses downward when the distance is less than a predefined threshold distance. Additionally or alternatively, the control circuitry is configured to reduce a distance between the optical centers of the first and second electrically-tunable lenses when the distance is less than a predefined threshold distance.

There is furthermore provided, in accordance with an embodiment of the invention, an optical method, which includes providing an optical device, which includes an electro-optical layer, having an effective local index of refraction at any given location within an active area of the electro-optical layer that is determined by a voltage waveform applied across the electro-optical layer at the location, and conductive electrodes disposed over opposing first and second side of the electro-optical layer. Control voltage waveforms are applied between the conductive electrodes so as to generate a phase modulation profile in the electro-optical layer that causes rays of optical radiation that are incident on the device to converge or diverge with a given focal power, while varying an amplitude of the control voltage waveforms for the given focal power responsively to an angle of incidence of the rays that impinge on the device from a direction of interest.

There is also provided, in accordance with an embodiment of the invention, an optical method, which includes providing an optical device, which includes an electro-optical layer, having an effective local index of refraction at any given location within an active area of the electro-optical layer that is determined by a voltage waveform applied across the electro-optical layer at the location, and conductive electrodes disposed over first and second side of the electro-optical layer. First control voltage waveforms are applied between the conductive electrodes so as to generate a first phase modulation profile in the electro-optical layer, which causes rays of optical radiation that are incident on the device to converge or diverge with a first focal power. In preparation for changing from the first focal power to a second focal power, overshoot control voltages are concurrently applied to each of a plurality of the conductive electrodes for different, respective transition periods. Subsequent to the overshoot control voltages, second control voltage waveforms are applied between the conductive electrodes so as to generate a second phase modulation profile in the electro-optical layer, which causes the rays of the optical radiation that are incident on the device to converge or diverge with the second focal power.

There is additionally provided, in accordance with an embodiment of the invention, an optical method, which includes providing an optical device, which includes an electro-optical layer, having an effective local index of refraction at any given location within an active area of the electro-optical layer that is determined by a voltage waveform applied across the electro-optical layer at the location, and conductive electrodes disposed over first and second side of the electro-optical layer. Control voltage waveforms are applied between the conductive electrodes so as to generate a phase modulation profile in the electro-optical layer that causes rays of optical radiation that are incident on the device to converge or diverge with a given focal power. The device is changed from the given focal power to zero focal power by concurrently applying a predefined high voltage to all of the conductive electrodes on the first side of the electro-optical layer, followed by application of a predefined low voltage thereto.

There is further provided, in accordance with an embodiment of the invention, an optical method, which includes providing an optical device, which includes an electro-optical layer, having an effective local index of refraction at any given location within an active area of the electro-optical layer that is determined by a voltage waveform applied across the electro-optical layer at the location, and conductive electrodes disposed over first and second side of the electro-optical layer. First control voltage waveforms are applied between the conductive electrodes so as to generate a first phase modulation profile in the electro-optical layer, which causes rays of optical radiation that are incident on the device to converge or diverge with a first focal power. In preparation for changing from the first focal power to a second focal power, overshoot control voltages are concurrently applied to each of a plurality of the conductive electrodes. Subsequent to the overshoot control voltages, second control voltage waveforms are applied between the conductive electrodes so as to generate a second phase modulation profile in the electro-optical layer, which causes the rays of the optical radiation that are incident on the device to converge or diverge with the second focal power. The overshoot control voltages applied to at least one electrode among the plurality of the conductive electrodes depend both on the first and second control voltage waveforms that are applied to the at least one electrode and on the control voltage waveforms that are applied to one or more other conductive electrodes that are adjacent to the at least one electrode.

There is moreover provided, in accordance with an embodiment of the invention, an optical method, which includes providing spectacles including first and second electrically-tunable lenses mounted in a spectacle frame and having respective focal powers and optical centers that are determined by voltage waveforms applied thereto. An input indicative of a distance from an eye of a person wearing the spectacles to an object viewed by the person is received. Responsively to the distance, the voltage waveforms are automatically modified so as both to tune the focal powers and to shift the optical centers of the electrically-tunable lenses.

There are furthermore provided, in accordance with an embodiment of the invention, adaptive spectacles, including a spectacle frame and first and second electrically-tunable lenses, mounted in the spectacle frame and having respective focal powers and optical centers that are determined by voltage waveforms applied thereto. Control circuitry is configured to apply control voltage waveforms so as to shift the optical centers of the electrically-tunable lenses responsively to the focal powers of the electrically-tunable lenses.

In some embodiments, the control circuitry is configured to shift the optical centers of the first and second electrically-tunable lenses downward and/or to reduce a distance between the optical centers of the first and second electrically-tunable lenses when the focal powers of the electrically-tunable lenses are increased.

The present invention will be more fully understood from the following detailed description of the embodiments thereof, taken together with the drawings in which:

DETAILED DESCRIPTION OF EMBODIMENTS

System Description

Figure 1:
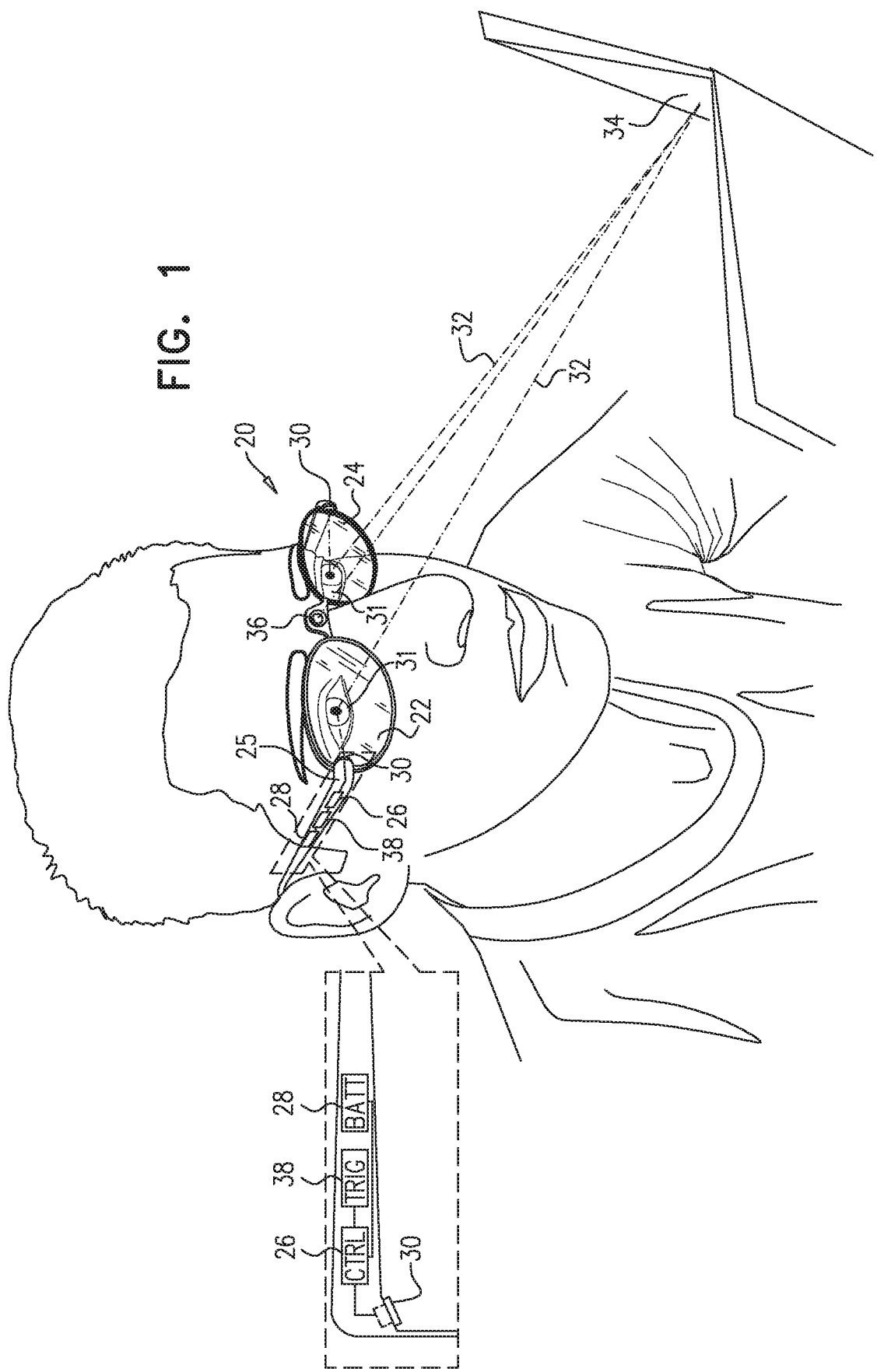
FIG. 1 is a schematic, pictorial illustration of adaptive spectacles, in accordance with an embodiment of the invention.

FIG. 1 is a schematic, pictorial illustration of adaptive spectacles 20, in accordance with an embodiment of the invention. Spectacles 20 comprise electrically-tunable lenses 22 and 24, mounted in a frame 25. The optical properties of the lenses, including focal length and optical center (or equivalently, the location of the optical axis) are controlled by control circuitry 26, which is powered by a battery 28 or other power source. Control circuitry 26 typically comprises an embedded microprocessor with hard-wired and/or programmable logic components and suitable interfaces for carrying out the functions that are described herein. These and other elements of spectacles 20 are typically mounted on or in frame 25, or may alternatively be contained in a separate unit (not shown) connected by wire to frame 25.

In some embodiments, lenses 22 and 24 are compound lenses, which comprise multiple elements: For example, each of lenses 22 and 24 may comprise a fixed lens, typically made from glass or plastic, providing a baseline optical power, which is modified dynamically by one or more electrically-tunable optical phase modulators that are integrated with the fixed lens. (For this reason, lenses 22 and 24 can themselves be considered electrically-tunable lenses.) Alternatively, lenses 22 and 24 may each comprise only a single electrically-tunable element, and the fixed lens may not be needed in some applications. Lenses 22 and 24 may each comprise a pair of electrically-tunable cylindrical lenses, with orthogonal cylinder axes. Alternatively, lenses 22 and 24 may each comprise a single electrically-tunable element, which is configured to generate two-dimensional phase modulation profiles and thus emulate spherical or aspheric lenses (or their Fresnel equivalents). Both of these sorts of lens configurations, as well as waveforms for driving the lenses, are described in detail in the above-mentioned WO 2014/049577 and WO 2015/186010.

In some embodiments, lenses 22 and 24 comprise two (or more) electrically-tunable elements with polarization-dependent electro-optical layers, which are oriented so as to refract mutually-orthogonal polarizations. Alternatively, lenses 22 and 24 may comprise polarization-independent electro-optical layers, for example as described in PCT Patent Application PCT/IB2017/051435, filed Mar. 13, 2017, whose disclosure is incorporated herein by reference.

In some embodiments, spectacles 20 comprise one or more sensors, which sense the distance from an eye 31 of the person wearing the spectacles to an object 34 viewed by the person. Control circuitry 26 tunes lenses 22 and 24 according to the sensor readings. In the pictured example, the sensors include a pair of eye trackers 30, which detect respective gaze directions 32 of right and left eyes 31. Control circuitry 26 typically shifts the respective optical axes of lenses responsively to the sensed gaze directions. Furthermore, the control circuitry can use the distance between the pupils, as measured by eye trackers 30, to estimate the user's focal distance (even without analyzing the actual gaze direction), and possibly to identify the distance between the eye and object 34.

Additionally or alternatively, a camera 36 captures an image of object 34, for use by control circuitry 26 in identifying the object and setting the focal distance. Either eye trackers 30 or camera 36 may be used in determining the focal distance, but both of these sensors can be used together to give a more reliable identification of the object. Alternatively or additionally, camera 36 may be replaced or supplemented by a rangefinder or other proximity sensor, which measures the distance to object 34.

In some embodiments, spectacles 20 also include at least one trigger sensor 38, which activates the other components of spectacles 20. For example, trigger sensor 38 may comprise a timer that triggers control circuitry 26 and other elements periodically, or other sensors indicating a possible change of the viewing distance, such as a head movement sensor, or a user input sensor.

Lenses 22 and 24 typically have better optical quality in the optical center of the lens than in the lens periphery. (The optical center is the point on the lens through which the optical axis passes, i.e., the axis of symmetry of the phase modulation profile of the lens, which can be shifted in an electrically-tunable lens by changing the voltage waveforms that drive the lens.) Therefore, it is beneficial to center the lenses opposite the pupils and to move the optical center of the lens dynamically, by modifying the voltage waveforms applied to the electrically-tunable lenses so that the optical center of the lens is always opposite the pupil.

Alternatively, when lenses 22 and 24 are used as dynamic focal spectacles for presbyopia, the optical center can be predefined as a function of optical power or equivalently, of distance to the object, as indicated by an input from eye trackers 30 and/or camera 36, for example. In general, the distance between the lens centers for far view is determined by the pupil distance of the wearer. When the wearer is looking at a closer distance and requires focus adjustment, control circuitry 26 can modify the voltage waveforms so as to switch lenses 22 and 24 to the correct optical power while reducing the distance between the lens center positions, to adjust for the fact that when a person looks at a closer distance the distance between the pupils is decreased. Additionally or alternatively, control circuitry 26 can adjust the height of the optical centers of the lenses, for example by shifting the optical centers of lenses 22 and 24 downward when the distance to the object is less than a predefined threshold distance, to reflect the tendency of people to look through a lower part of the spectacles when viewing close objects.

Figure 2:
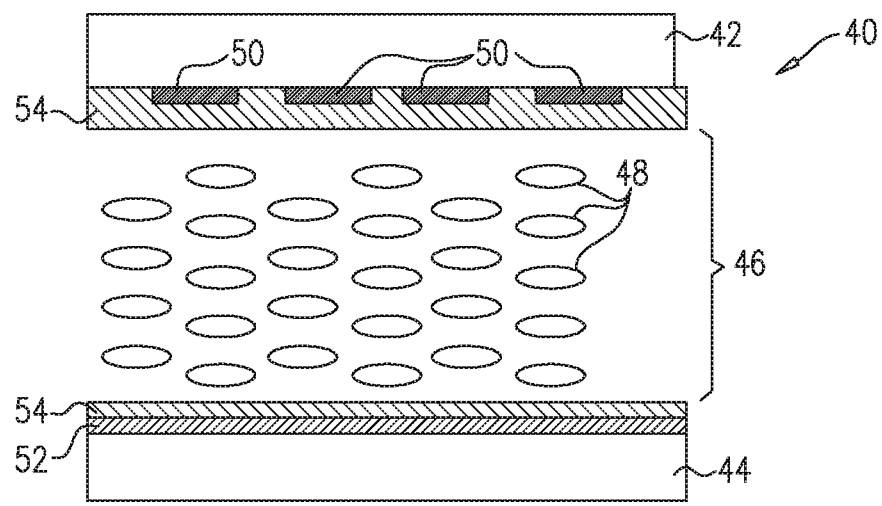
FIG. 2 is a schematic sectional view of an electrically-tunable optical phase modulator, in accordance with an embodiment of the invention.

FIG. 2 is a schematic sectional view of an optical phase modulator 40, which defines the active area of an electrically-tunable lens (such as lens 22 or 24), in accordance with an embodiment of the invention. Phase modulator 40 comprises an electro-optical layer 46, sandwiched between an upper substrate 42 and a lower substrate 44, which comprise a transparent material, for example, glass. Layer 46 comprises a liquid crystal material, which is typically contained by suitable encapsulation, as is known in the art. Substrates 42 and 44 can be coated on their insides with a polyimide alignment layer 54 (for example PI-2555, produced by Nissan Chemical Industries Ltd., Japan), which causes liquid crystal molecules 48 to line up in a desired parallel orientation.

Conductive electrodes 50 and 52 are disposed over opposing first and second sides of electro-optical layer 46. Electrodes 50 and 52 comprise a transparent, conductive material, such as indium tin oxide (ITO), as is known in the art, which is deposited on the surfaces of substrates 42 and 44, respectively. (Alternatively, non-transparent excitation electrodes may be used, as long as they are thin enough so that they do not cause disturbing optical effects.) Although for the sake of visual clarity, only a few electrodes are shown in FIG. 2, in practice, for good optical quality, optical phase modulator 40 will typically comprise at least 100 stripe electrodes for excitation, and possibly even 400 or more.

Electrodes 50 in the pictured embodiment are arranged as an array of parallel stripes. On the opposite side of layer 46, electrodes 52 may comprise stripes perpendicular to electrodes 50, which enable control circuitry 26 to apply two-dimensional voltage patterns across layer 46. Alternatively, electrode 52 may comprise a uniform layer on substrate 44, functioning as an electrical ground plane. In this latter case, only one-dimensional voltage patterns can be applied across layer 46, which can be used to create phase modulation profiles equivalent to cylindrical lenses. Two such optical phase modulators 40 in series, with electrodes 50 oriented orthogonally one to the other, can be used in each of lenses 22 and 24 to generate two-dimensional optical modulation patterns.

Due to the behavior of liquid crystal molecules 48, electro-optical layer 46 has an effective local index of refraction at any given location within the active area of the layer that is determined by the voltage waveform that is applied across the electro-optical layer at that location. Control circuitry 26 is coupled to electrodes 50 and 52 and applies the appropriate control voltage waveforms to the electrodes so as to modify the optical phase modulation profile of the electro-optical layer 46. When used in spectacles, the phase modulation profile is chosen to emulate a lens, causing rays of optical radiation that are incident on optical phase modulator 40 to converge or diverge with a desired focal power. For strong focal power, the phase modulation profile may comprise a Fresnel profile, with sharp peaks and troughs. Alternatively or additionally, the control voltage waveforms may be chosen so as to give rise to a smooth refractive phase modulation profile.

Further details of a variety of electrode structures that can be used in electrically-tunable lenses, as well as the control voltage waveforms that may be applied to such electrodes in order to generate various sorts of phase modulation profiles, are described in the above-mentioned WO 2014/049577 and WO 2015/186010. These details are omitted here for the sake of brevity.

Adjustment of Control Voltage Waveforms for Angle of Incidence

When a lens is positioned in front of a human eye, the area of the lens through which light passes and reaches the central vision area on the retina (the fovea) depends on the angle at which the person is looking. When the person looks straight ahead, light reaching the fovea typically passes the lens through the central area of the lens, in a direction generally normal to the lens. When the person looks to the side, the eye rotates, the pupil moves, and the light reaching the fovea passes through a different region in the lens, typically at an acute angle to the lens surface. Thus, different areas of the lens are used primarily to refract light that is incident at different angles. The embodiments that are described in this section of the present patent application optimize the performance of an electrically-tunable lens to account for this point.

Figure 3:
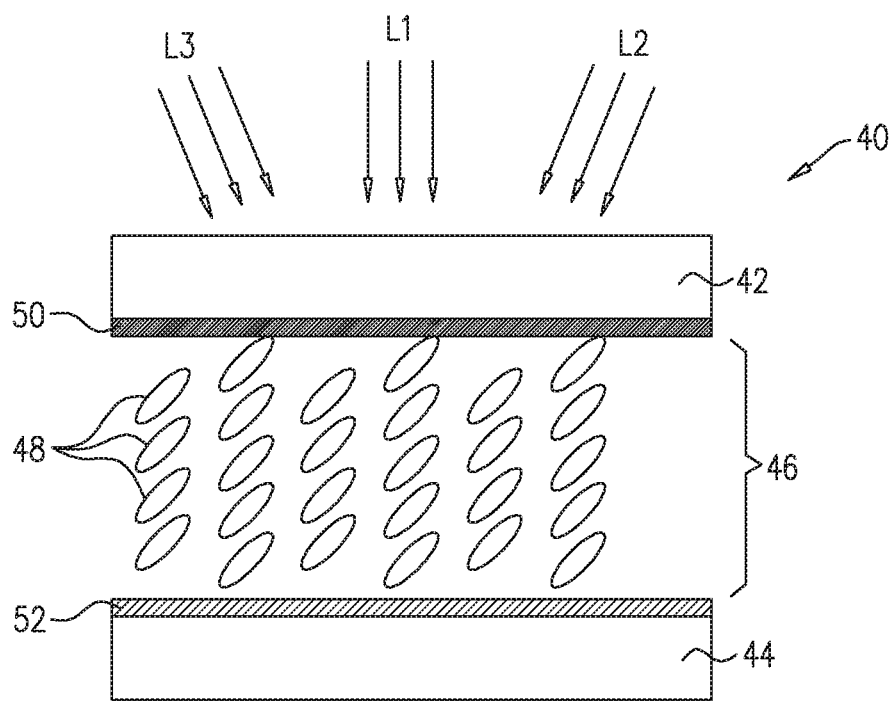
FIG. 3 is a schematic sectional view of rays incident at different angles on an electrically-tunable lens, in accordance with an embodiment of the invention.

FIG. 3 is a schematic sectional view of rays incident at different angles on optical phase modulator 40 in an electrically-tunable lens, such as lens 22 or 24, in accordance with an embodiment of the invention. In this figure, a certain control voltage has been applied between electrodes 50 and 52, thus changing the angle of orientation of liquid crystal molecules 48, and hence changing the effective index of refraction of electro-optical layer 46.

FIG. 3 illustrates conceptually the difference in the effective refractive index for light that is incident along a normal to modulator 40, marked L1, in comparison with light incident at an acute angle from two different, opposing azimuths, marked L2 and L3. For light incident at the angle L2, the effective refractive index is different from that of L1, due to the different angle between the propagation axis (which determines the direction of the electrical field of the incident light) and the director axis of liquid crystal molecules 48. For light incident at the angle L3, the refractive index is different from that of both L1 and L2. Therefore, for each incidence angle $\alpha$ there is a different phase vs. voltage graph, defined by the function $\phi = T_\alpha(V)$.

Figure 4:
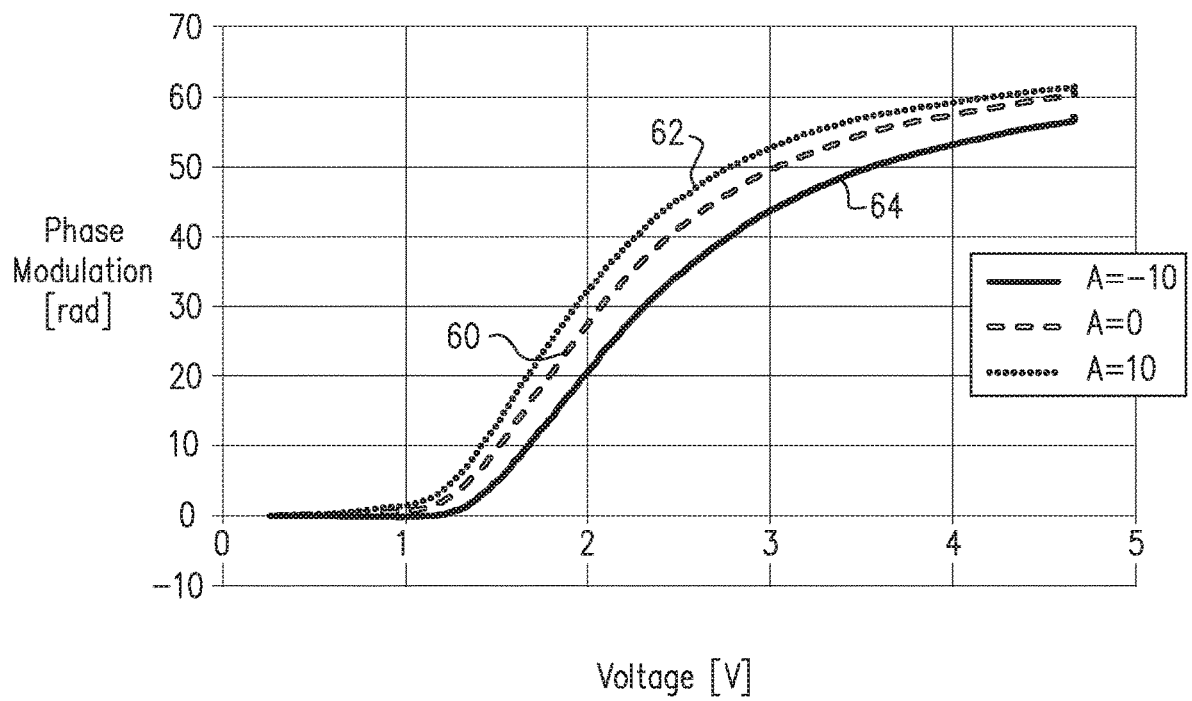
FIG. 4 is a plot that schematically shows a relation between phase modulation by an electrically-tunable lens and applied voltage for different angles of incidence, in accordance with an embodiment of the invention.

FIG. 4 is a plot that schematically shows the relation between phase modulation by modulator 40 as a function of applied voltage V between electrodes 50 and 52 for different angles of incidence, in accordance with an embodiment of the invention. The phase modulation was measured using an interferometer for three different angles of incidence $\alpha = 0$, 10, and −10 degrees, giving curves 60, 62 and 64, respectively. (The values 10 and −10 refer to incidence at 10° from the normal at opposing azimuths.) The relation between voltage and phase modulation, $T_\alpha(V)$, can be measured in this manner over a range of incidence angles of interest, and intermediate angular values can readily be interpolated from the measured values.

Figure 5:
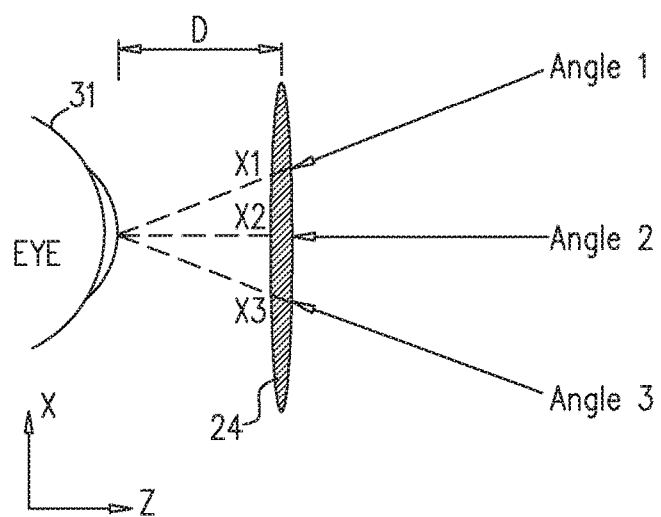
FIG. 5 is a schematic side view of an electrically-tunable lens illustrating a relation between angle of incidence and beam axis, in accordance with an embodiment of the invention.

FIG. 5 is a schematic side view of electrically-tunable lens 24 and eye 31, illustrating the relation between the areas of lens 24 through which beams pass and the angle of incidence of the beams on the lens, in accordance with an embodiment of the invention. The figure illustrates how different areas of the lens are used by eye 31 to view objects in different directions. In a liquid crystal lens, it is thus desirable to optimize the modulation of the liquid crystal in each area to account for the incidence angle of rays that impinge on the lens from the direction of interest. The "direction of interest" is defined generally by the relation between points in the object region and the corresponding points in the image plane of the lens. Thus, for example, in a spectacle lens, the direction of interest for any given area on the lens surface can be defined as the angle of a ray that passes through the area between a location on the eye (such as the pupil or an image point on the retina) and a corresponding location in the object region toward which the person wearing the spectacles is looking. This relation between areas of lens 24 and corresponding directions of interest is exemplified by the rays shown in FIG. 5.

For a given target phase modulation profile of a lens, $\phi(x)$, a corresponding voltage profile $V(x)$ is applied, such that $\phi(x)=T_\alpha(V(x))$. Since $T_\alpha$ is not symmetrical, i.e., $T_\alpha \neq T_{-\alpha}$, as explained above, a non-symmetrical voltage profile $V(x)$ is needed in order to achieve a symmetrical phase modulation profile $\phi(x)$, such as a spherical or aspherical lens, that extends over the entire field of view. In other words, to achieve a particular symmetrical refractive profile, the voltage applied across electro-optical layer 46 at a given distance from the lens center on one side of the field will be markedly greater than at the same distance from the center on the other side of the field.

In one embodiment of the invention, lens 24 can be optimized for a certain viewing angle, for example straight ahead (i.e., Angle 2 in FIG. 5). Lens 24 is positioned at a distance D from the pupil of eye 31. The target phase modulation profile, for instance a profile that emulates an aspheric lens, is $\phi(x)$. Positions on the lens (X1, X2, X3, ...) are mapped to light incidence angles as shown in the figure, for example using the formula $\alpha(x)=\tan^{-1}(x/D)$. The voltage profile applied between electrodes 50 and 52 is then translated using the phase vs. voltage mapping into a function of x and $T_\alpha(V)$: $V(x)=T_\alpha^{-1}(\phi(x))$.

In an alternative embodiment, every position on lens 24 is optimized for the incidence angle of light passing through that position in the lens when eye 31 is looking in that direction. The difference between this embodiment and the previous embodiment is that in this case the optimization also depends on the movement of the pupil as the person is looking to the side, leading to a different mapping between position on the lens and light incident angle, $\alpha(x)$. For example, this mapping can be estimated in the present case by $\alpha(x)=\tan^{-1}(x/L)$, wherein L in the distance between the center of rotation of the eye and the lens. The calculation of the required voltage profile is performed in the same manner as in the previous embodiment, but with a different incidence angle mapping $\alpha(x)$.

Figure 6A:
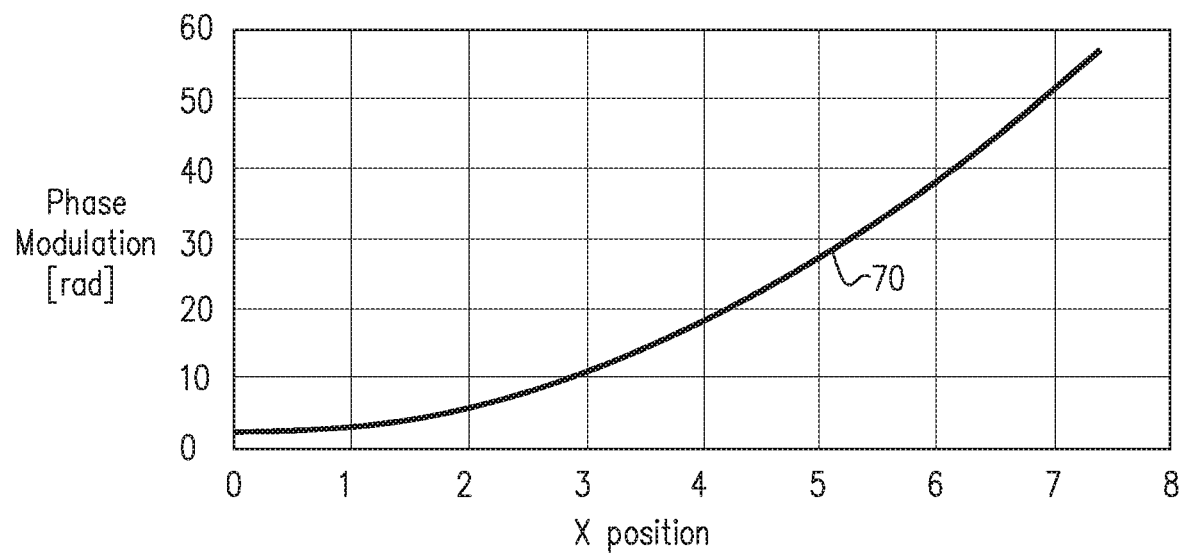
FIG. 6A is a plot that schematically illustrates a phase modulation profile of an electrically-tunable lens, in accordance with an embodiment of the invention.
Figure 6B:
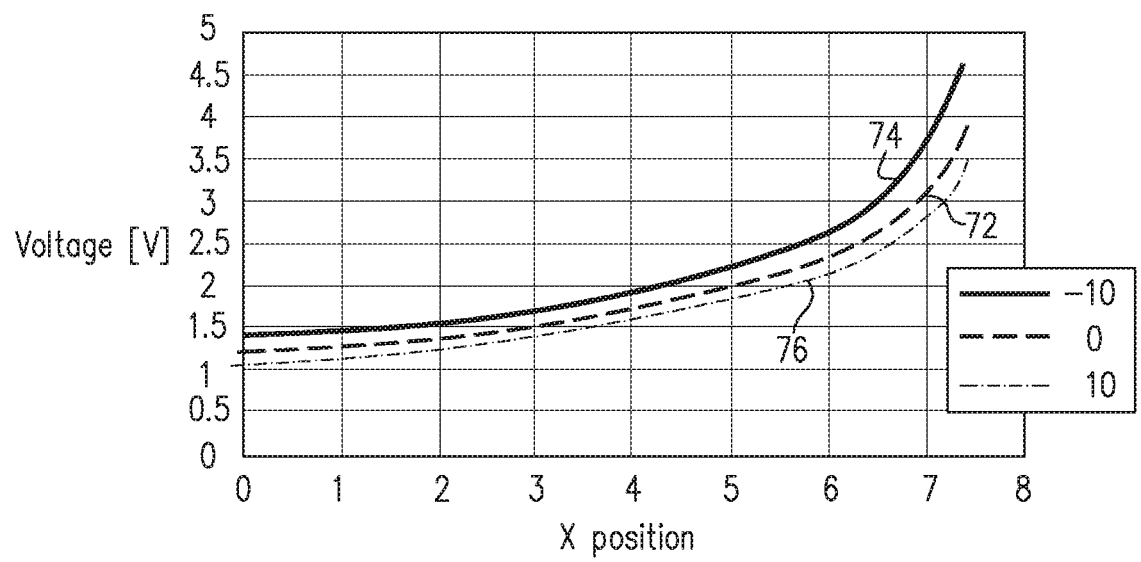
FIG. 6B is a plot that schematically shows a relation between the phase modulation profile of FIG. 6A and the voltage applied to the electrically-tunable lens in order to generate the corresponding phase modulation for different angles of incidence, in accordance with an embodiment of the invention.

FIGS. 6A and 6B are plots that schematically illustrate the principles of this approach in implementing a particular refractive phase profile across lens 24, in accordance with an embodiment of the invention. FIG. 6A illustrates a phase modulation profile 70, while FIG. 6B shows the relation between this phase modulation profile and the voltage applied to optical phase modulator 40 in order to generate the corresponding phase modulation for different angles of incidence. A curve 72 shows the required voltage as a function of position across modulator 40 for light that is normally incident (0 degrees) on phase modulator 40, while curves 74 and 76 show the respective modifications needed in the voltage profile when the light is incident at −10 or +10 degrees.

The amplitudes of the control voltage waveforms (meaning the voltage levels in the present embodiments) applied by control circuitry 26 for a given focal power of lens 24 are thus adjusted to account for the angles of incidence of the light rays on the lens. In the present example, the amplitudes vary over the area of lens 24 based on the mapping described above of the angles of incidence of the rays over the area of the lens. As explained earlier, the adjustment of control voltages for the angle is non-symmetrical, meaning that to achieve a given focal power, a different voltage will be applied at positive angles from that applied at the corresponding negative angles to obtain identical phase modulation.

As a specific example, assume that lens 24 is positioned at a distance L=3 cm from the center of rotation of the eye. This example will illustrate how to calculate the applied voltage for three different electrodes, located at x=0 (lens center) and transverse displacements x=−5.3 mm and x=+5.3 mm from the center. The required phase modulation pattern is taken to be a spherical lens with optical power of two diopters, with a Fresnel structure: $\phi(x)=\pi x^2/\lambda f \mod 2\pi n$, wherein $\lambda=0.5$ μm is the optical wavelength, f=0.5 m is the focal length, and n=9 is the Fresnel structure height in radians.

For the center electrode:
  The required phase modulation is $\phi(x=0)=0$.
  The incidence angle is $\alpha(x=0)=\tan^{-1}(x/L)=0$.
  As shown in FIG. 4, the required voltage is V=0 V (or V<0.5 V).
For x=−5.3 mm:
  The required phase is $\phi(x=-5.3 \text{ mm})=13.7$ rad.
  The incidence angle is: $\alpha(x=-5.3)=\tan^{-1}(x/L)=-10°$.
  The required voltage from FIG. 4 is V=1.8 V.
For x=+5.3 mm:
  The required phase is $\phi(x=+5.3 \text{ mm})=13.7$ rad.
  The incidence angle is: $\alpha(x=+5.3)=\tan^{-1}(x/L)=+10°$.
  The required voltage from FIG. 4 is V=1.5 V.

As noted earlier, although the phase modulation profile is symmetrical, with $\phi(x)=\phi(-x)$, the applied voltage profile is not symmetrical, i.e., $V(x) \neq V(-x)$.

Although the example above is one-dimensional, it can be readily extended to two dimensions by applying the sorts of modifications described above to the two-dimensional modulation configurations that are described in the above-mentioned WO 2014/049577 and WO 2015/186010.

Reduction of Switching Latency Using Overdrive

As explained above, control circuitry 26 applies different control voltage waveforms between conductive electrodes 50 and 52 in order to generate different phase modulation profiles, which cause rays of optical radiation that are incident on the lenses 22 and 24 to converge or diverge with different, respective focal powers. The phase modulation is achieved by rotation of liquid crystal molecules 48, and changing the voltage changes the rotation angle and hence the effective local refractive index.

Because of the nature of the liquid crystal material, however, there can be substantial latency in rotation of the molecules following a change in applied voltage. This latency, in turn, can lead to a noticeable delay in accommodation of spectacles 20 to changes in viewing distance and/or angle of eyes 31. Therefore, in the embodiments that are described in this section, control circuitry 26 uses overdrive techniques to reduce the transition time between different focal powers. In other words, in switching between first and second sets of control voltage waveforms, corresponding to two different focal powers, control circuitry 26 first applies overshoot or undershoot voltages to certain electrodes 50 over certain transition periods, and only then applies the second set of control voltage waveforms. The degree and timing of the overshoot and/or undershoot (i.e., the amplitudes and periods of application of the overshoot or undershoot voltages) can vary from electrode to electrode, depending upon the initial and final voltage waveforms applied to each electrode; but it is a feature of the device architecture provided by the present embodiments that the different overshoot and undershoot voltages can be applied concurrently and independently to the different electrodes.

In some of the present embodiments, control circuitry 26 generates the required overshoot or undershoot by applying a predefined high or low voltage to at least some of electrodes 50 for different, respective time durations. (The voltages are "high" or "low" relative to the range of voltages applied over all the electrodes in steady state and may comprise, for example, the maximum and minimum voltage levels, respectively, that can be applied by control circuitry 26.) This scheme is relatively simple to implement, while minimizing the time required for the change in focal power. For example, let us assume that driving optical phase modulator 40 to create a focal power D1 requires applying a voltage V1($i$) to each electrode i, while focal power D2 requires applying voltages V2($i$). If for a given electrode k, V1($k$)<V2($k$), then upon initiating the change from D1 to D2, control circuitry 26 will first change the voltage applied on electrode k to Vmax—a predefined high voltage that is typically equal to the maximal voltage that can be applied to the electrode. The voltage is held at Vmax for a period T1. Similarly, if V1($k$)>V2($k$), the voltage applied on electrode k is first changed to Vmin—a predefined low voltage typically equal to the minimal voltage that can be applied to the electrode—for a period T2, whose duration similarly depends on the initial voltage V1($k$) and the final voltage V2($k$).

As the durations of T1 and T2 depend on the initial voltage V1($k$) and the final voltage V2($k$), control circuitry 36 can use a look-up table (LUT) to hold the required overdrive periods T(V1,V2). After the appropriate period T in each case, as indicated by the value in the LUT, the voltage of electrode k is set to V2($k$). The period T(V1,V2) is set to be equal to the time it takes liquid crystal molecules 48 to rotate from their initial angle, due to the voltage V1, to a target angle corresponding to voltage V2, while applying Vmax on the electrode.

The application of different transition periods to the different electrodes can be further simplified by the use of fixed time slots in defining the different transition periods. Thus, in some embodiments, the transition times T(V1,V2) are divided into multiple time slots, for example five or more predefined time slots. A first overshoot voltage is applied during one or more initial time slots, followed by a second overshoot voltage applied during a subsequent time slot. For example, when switching from V1 to V2, the voltage can first be switched to Vmax (or Vmin if V2<V1) for a number of time slots, and then the voltage is changed to a different, intermediate value Vx for a single time slot. In this case, two LUTs are used to determine the voltage waveform required in order to switch rapidly from V1 to V2: One LUT includes the number of time slots over which the voltage is held at Vmax (or Vmin), and the other holds the intermediate value Vx(V1,V2).

As a specific example, assume that in switching from a certain V1 to a certain V2 with time slots of 1 ms, if the voltage is held at Vmax for 5 ms, liquid crystal molecules 48 will not yet reach the required angle corresponding to voltage V2. If the voltage is held at Vmax for 6 ms, however, the molecules may rotate more than is required for voltage V2. Therefore, for a transition from V1 to V2, the first LUT will contain the value 5 (5 ms of V=Vmax); and for the next time slot of 1 ms, the voltage, read from the second LUT, will be Vx(V1,V2). Typically, Vx(V1,V2)>V2 (for the case V2>V1).

In another embodiment of the invention, the time slots are not uniform in length, but rather are graduated in order to increase the number of electrodes that reach their target values after shorter delays. This approach can achieve better optical quality in less time. For instance, to reduce the required memory size and logic complexity, control circuitry 26 may be limited to ten time slots, with a total required overdrive time (worst-case transitions) of 1 sec. Typically, however, most of the transitions require significantly less time than the worst case. The duration of the time slots is therefore distributed unevenly, for example by dividing the ten available time slots into three slots of 25 ms, followed by two slots of 50 ms, and then one slot each of 75 ms, 100 ms, 150 ms, 200 ms and 300 ms.

The difference between this graduated scheme and a simple scheme using ten uniform slots of 100 ms each is that when the graduated scheme is used, fast transitions can be optimized to shorter times, thus achieving better lens quality faster. The fact that a small number of individual pixels in phase modulator 40 may take relatively longer to reach their target phase angles is insignificant, since the lens quality depends on the percentage of pixels that have reached the correct state. It is therefore useful to maximize the number of "correct" pixels within a short time by using graduated time slots, even if other pixels will take longer to settle.

Figure 7A:
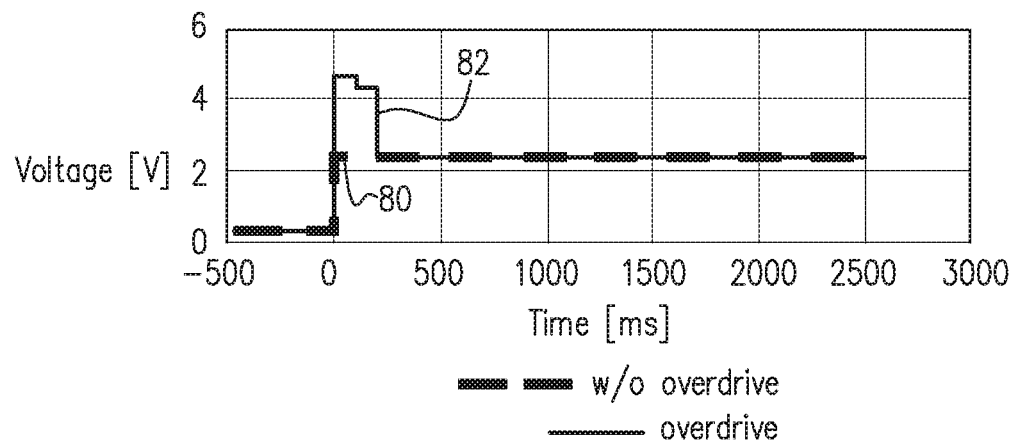
FIG. 7A is a plot that schematically illustrates voltage waveforms applied over time to an electrically-tunable lens in order to modify a phase modulation in the lens, in accordance with an embodiment of the invention.
Figure 7B:
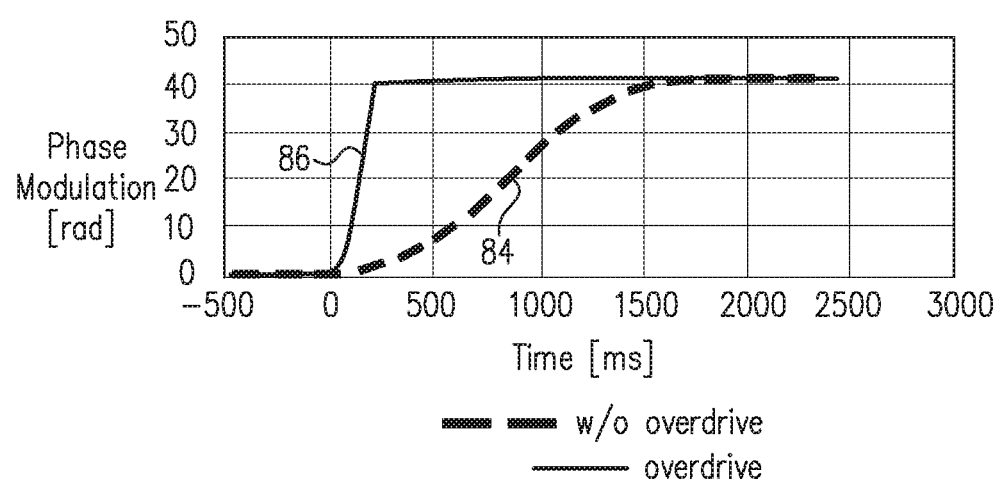
FIG. 7B is a plot that schematically illustrates the phase modulation achieved over time by applying the waveforms of FIG. 7A.

FIGS. 7A and 7B are plots that schematically illustrate the application of overshoot voltage waveforms over time to optical phase modulator 40 in order to modify the local phase modulation, in accordance with an embodiment of the invention. FIG. 7A shows a voltage waveform 80 without overshoot, along with a voltage waveform 82 in which an overshoot voltage is applied to one of electrodes 50 in two successive time slots. FIG. 7B shows a phase modulation curve 84 over time that results from application of waveform 80, without overshoot, along with a phase modulation curve 86 that is obtained by application of waveform 82. The actual phase modulation characteristics were measured using a liquid crystal panel with a total phase modulation of 61 radians and an overdrive scheme using five time slots (two slots of 100 ms, followed by three slots of 200 ms). The voltage waveforms applied to the liquid crystal were AC voltages at a frequency of 1 kHz, and FIG. 7A therefore shows the RMS voltage as a function of time.

In both of waveforms 80 and 82, the voltage was switched from 0.25 V to 2.4 V, and the resulting phase modulation in curves 84 and 86 changed from 0 to 42 radians. Without overdrive, the change in phase modulation took nearly 2 sec, as shown by curve 84. In waveform 82, the voltage was first switched to the maximal voltage Vmax=4.7 V for one time slot of 100 ms, and then the voltage was switched to an intermediate voltage of 4.3 V for the second time slot of 100 ms. The voltage was switched to the final value of 2.4 V after 200 ms. Thus, in the case of curve 86, the phase transition was much faster, about 200 ms. To implement the transition illustrated by waveform 82 using the two LUTs described above, the first LUT will hold the value 1 (one time slot of maximal voltage), and the second LUT will hold the value 4.3 (4.3 V, or some integer index corresponding to 4.3 V).

Figure 8A:
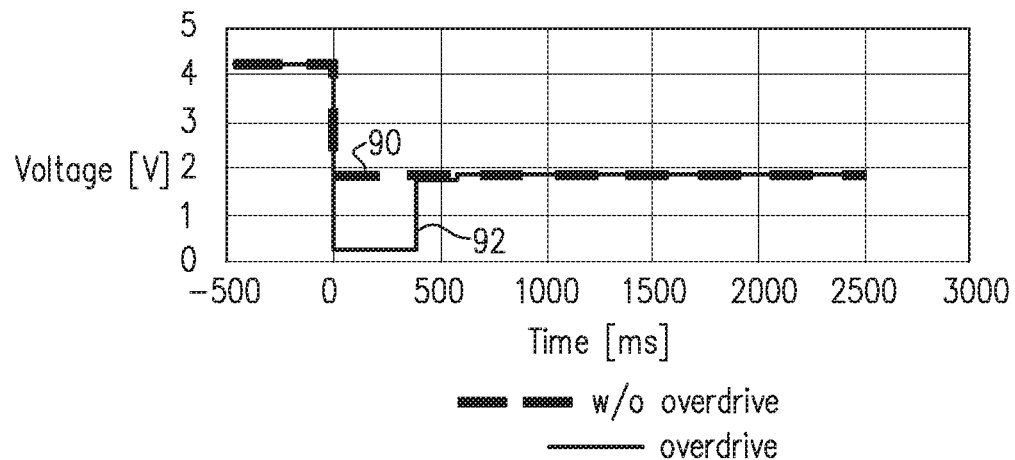
FIG. 8A is a plot that schematically illustrates voltage waveforms applied over time to an electrically-tunable lens in order to modify a phase modulation in the lens, in accordance with another embodiment of the invention.
Figure 8B:
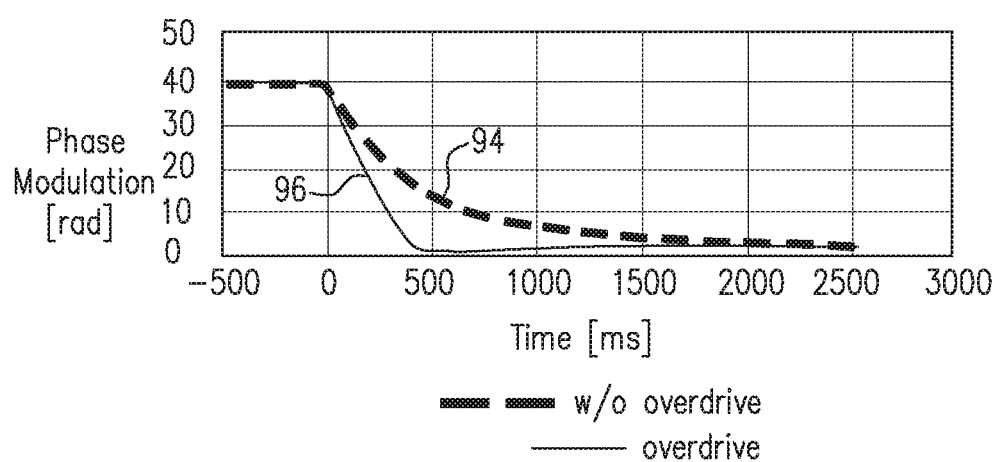
FIG. 8B is a plot that schematically illustrates the phase modulation achieved over time by applying the waveforms of FIG. 8A.

FIGS. 8A and 8B are plots that schematically illustrate the application of undershoot voltage waveforms over time to optical phase modulator 40 in order to modify the local phase modulation, in accordance with another embodiment of the invention. FIG. 8A shows a voltage waveform 90 without undershoot, along with a voltage waveform 92 in which an undershoot voltage is applied to one of electrodes 50 in two successive time slots. FIG. 8B shows a phase modulation curve 94 over time that results from application of waveform 90, without undershoot, along with a phase modulation curve 96, which is obtained by application of waveform 92.

In this case, using waveform 90 without overdrive, the voltage was switched from 4.1 V to 1.8 V, and the phase modulation illustrated by curve 94 changed from 39 to 3 radians in about 2 sec. Using the overdrive scheme illustrated by waveform 92, the voltage was first switched to the minimal voltage Vmin=0.2 V for three time slots (2×100 ms plus 1×200 ms, giving a total of 400 ms), after which the voltage was switched to an intermediate voltage of 1.7 V for the fourth time slot of 200 ms, and then to the final value of 1.8 V after a total of 600 ms. The phase transition from 39 to 3 radians was much faster in this case, as illustrated by curve 96, taking only about 500 ms. To implement waveform 92, the first LUT holds the value 3 (three time slots of minimal voltage), and the second LUT holds the intermediate voltage value 1.7 (or some integer index corresponding to 1.7 V).

Typically, as can be seen in the preceding figures, switching times to higher voltages are faster than switching times to lower voltages (i.e., rise times are shorter than fall times). Therefore, it is beneficial, when possible, to use rise times rather than fall times, for example when switching to zero focal power (turning the lens off). Although zero power is normally achieved by applying the minimum voltage (for example, zero voltage) to all of electrodes 50, zero focal power can often be reached more rapidly by applying equal high voltages to all of the electrodes.

Therefore, in another embodiment of the invention, control circuitry 26 switches optical phase modulator 40 off (i.e., switches to zero focal power), by concurrently applying a predefined maximum voltage, Vmax, to all of electrodes 50, followed by application of a predefined minimum voltage to all the electrodes. Switching to the maximum voltage rapidly turns off the focal power. Reducing the voltages to the minimum thereafter is not essential and can take place slowly. As long as the voltage is reduced uniformly over all the electrodes, the focal power of modulator 40 will remain at zero. The reduction of the voltages is useful in conserving power, as well as achieving faster transitions when the lens is turned back on.

A lens typically has a spatial phase modulation profile that is relatively slow-varying near the center of the lens, and becomes steeper farther from the lens center. For a dynamic lens based on optical phase modulator 40 (or another, similar electrically-tunable device), however, the phase modulation profile is applied by discrete electrodes 50. When the phase profile changes rapidly relative to the inter-electrode pitch (with a steep slope, as typically occurs far from the center of modulator 40), voltage differences between adjacent electrodes grow, and therefore electrical crosstalk between the electrodes becomes significant.

To mitigate this problem when the focal power of the lens is changed, control circuitry 26 can set the overdrive voltages (i.e., overshoot or undershoot) that are applied to each electrode in a manner that depends not only on the initial and final control voltage waveforms that are applied to the electrode itself, but also on the control voltage waveforms that are applied to the adjacent electrodes. Thus, for example, when switching the voltage applied to electrode k from $V1(k)$ to $V2(k) > V1(k)$, control circuitry 26 first sets the voltage to $Vod(k) > V2(k)$ for a period of $T(k)$, wherein $Vod(k)$ and/or $T(k)$ depends on the initial and final voltages of electrode k, $V1(k)$ and $V2(k)$, as well as on the initial and final voltages of the adjacent electrodes, $V1(k-1)$, $V2(k-1)$, $V1(k+1)$, and $V2(k+1)$. Similarly, if $V1(k) < V2(k)$, then the undershoot voltage will be $Vod(k) < V2(k)$, with a similar dependence on the adjacent electrodes. When there is strong crosstalk, more than one neighbor on each side can be considered when determining the overdrive duration.

Generally, both $T(k)$ and $Vod(k)$ can depend on the voltage transitions. The values of $T(k)$ and $Vod(k)$ can be stored in LUTs:
$T(V1(k-1), V1(k), V1(k+1), V2(k-1), V2(k), V2(k+1))$, and $Vod(V1(k-1), V1(k), V1(k+1), V2(k-1), V2(k), V2(k+1))$.
Storing these six-dimensional LUTs, however, can consume a substantial amount of memory.

The complexity and size of the LUTs can be reduced by assuming that the phase modulation profile of a lens changes smoothly (although this assumption does not hold for a Fresnel lens near the Fresnel phase transitions), and thus expressing $T(k)$ and $Vod(k)$ as functions of the slope of the phase modulation, rather than of the exact voltages of the adjacent electrodes. Therefore, in another embodiment of the invention, the overdrive voltage and/or overdrive duration when switching the voltage of electrode k is determined by $V1(k)$, $V2(k)$, $S1(k)$, and $S2(k)$, wherein $S1(k)$ and $S2(k)$ are the initial and final voltage slopes around electrode k, or alternatively, the initial and final slopes of the phase modulation profile around electrode k. In this case the LUTs are only four-dimensional: $Vod(V1,V2,S1,S2)$ and $T(V1,V2,S1,S2)$. The LUTs can be extended, as explained above, to include multiple overdrive time slots, with the overdrive voltage for each electrode in each time slot depending on the initial and final voltages of that electrode as well as on the initial and final voltages of the neighboring electrodes. When optical phase modulator 40 is driven to operate as a Fresnel lens, the resulting phase modulation profiles comprise multiple Fresnel phase transitions, where the phase modulation is discontinuous. In this case, the overshoot control voltages that depend on the adjacent conductive electrodes can be applied preferentially to the conductive electrodes that are in the vicinity of the Fresnel phase transitions. For these electrodes, for example, control circuitry 26 can use different LUTs, $Vod_F(V1,V2,S1,S2)$ and $T_F(V1,V2,S1,S2)$. The slopes here are calculated over the vicinity of the phase transition, rather than in the transition itself, which is discontinuous.

The optimal overdrive parameters, particularly for off-axis electrodes in locations of rapid phase transition, will vary depending on the properties of electro-optical layer 46 and other features and dimensions of optical phase modulator 40. It can be difficult to derive the overdrive parameters a priori, but the LUTs can be populated in each case by a simple process of trial and error.

Figure 9:
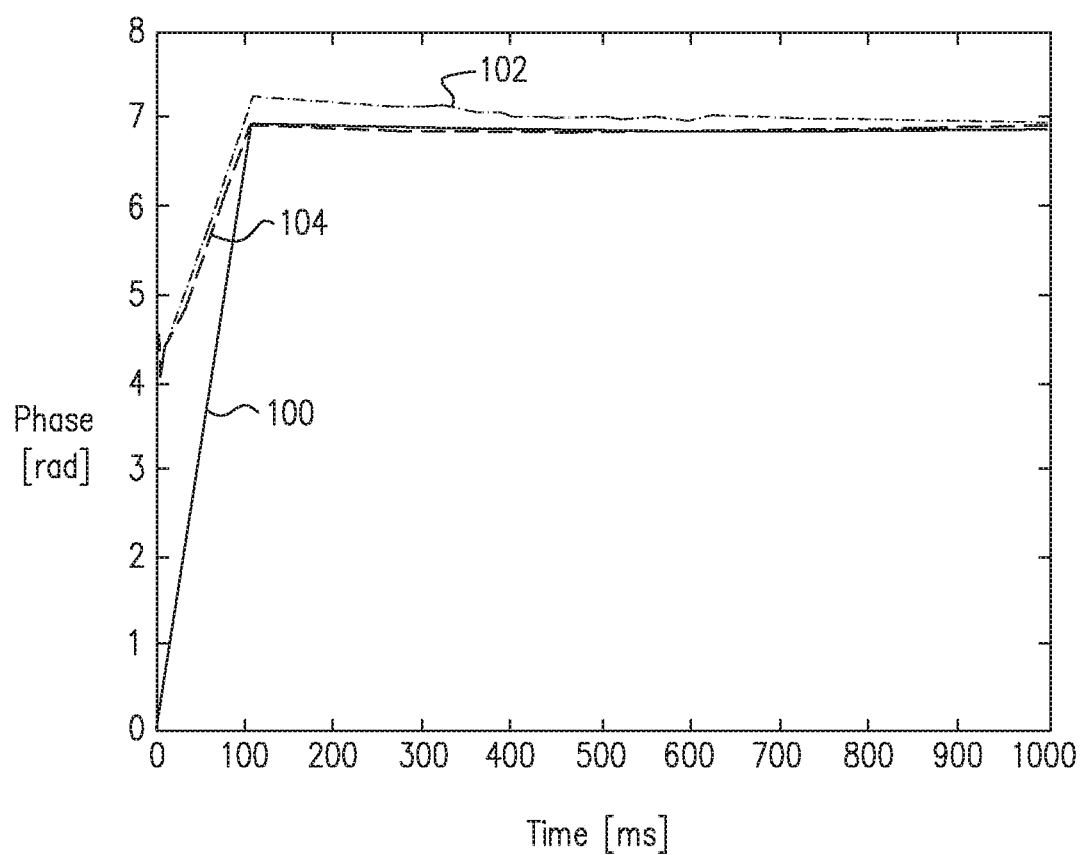
FIG. 9 is a plot that schematically illustrates phase modulations achieved over time by application of different voltage waveforms to an electrically-tunable lens, in accordance with an embodiment of the invention.

FIG. 9 is a plot that schematically illustrates phase modulation curves 100, 102 and 104 over time that are achieved by application of different voltage waveforms to electrodes 50 of optical phase modulator 40, in accordance with an embodiment of the invention. To obtain these curves, the average phase modulation was measured over time using a liquid crystal panel with a 20 μm electrode pitch. This figure illustrates an empirical optimization of overdrive parameters to account for crosstalk between adjacent electrodes.

Curve 100 shows the phase modulation profile achieved using optimal overdrive without crosstalk, as the same voltage is applied to all electrodes. The voltage was switched from V1=1.84 V to V2=2.04 V. Without crosstalk, and assuming 100 ms overdrive duration, the optimal overshoot voltage was found to be 2.65 V, which resulted in the phase transition illustrated by curve 100.

To generate curve 102, the panel was set to an initial voltage profile with alternating voltages of 1.84 V and 2.04 V on even- and odd-numbered electrodes, respectively, after which the voltage was switched to 2.04 V across all electrodes. The same overdrive scheme was used as in the previous case (though only on the electrodes that were previously set to 1.84 V), neglecting the crosstalk between adjacent electrodes. As shown by curve 102, the overdrive voltage was too high, and thus led to an undesirable overshoot in the phase modulation.

The overshoot voltage was then corrected to take the crosstalk into account, resulting in the lower overshoot value of 2.59 V. As a result, shown in curve 104, the overshoot disappears.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A spectacle lens, comprising:
    an electro-optical layer, having an effective local index of refraction at any given location within an active area of the electro-optical layer that is determined by a voltage waveform applied across the electro-optical layer at the location and configured to be positioned in front of a human eye at a given distance from the eye so as to apply to rays of optical radiation that are incident on the eye through the spectacle lens a refractive phase modulation profile φ(x) as a function of a position x across the lens about a central point (x=0), whereby the rays that are incident on the eye at the given distance from the lens pass through the lens at respective angles of incidence α(x);
    conductive electrodes disposed over opposing first and second side of the electro-optical layer; and
    control circuitry, which is configured to apply control voltage waveforms V(x) between the conductive electrodes so as to generate the refractive phase modulation profile in the electro-optical layer to cause the rays of optical radiation that are incident on the lens to converge or diverge with a given focal power, while varying the control voltage waveforms for the given focal power as a function of the position x responsively to the angles of incidence α(x) of the rays that impinge on the lens at each position.

2. The lens according to claim 1, wherein the electro-optical layer comprises a liquid crystal.

3. The lens according to claim 1, wherein the control circuitry is configured to apply a control voltage waveform at a predetermined amplitude in order to produce a given phase shift in the rays that are incident along a normal to the lens, and to apply the control voltage waveform at a first amplitude, which is less than the predetermined amplitude, to produce the given phase shift in the rays that are incident at an acute angle to the lens at a first azimuth, and to apply the control voltage waveform at a second amplitude, which is greater than the predetermined amplitude, to produce the given phase shift in the rays that are incident at the acute angle to the lens at a second azimuth, which is opposite to the first azimuth.

4. The lens according to claim 1, wherein the control circuitry is configured to vary respective amplitudes of the control voltage waveforms over an area of the lens responsively to a mapping of the angle of incidence of the rays over the area of the lens.

5. The lens according to claim 1, wherein the control circuitry is configured to change the lens from a first focal power to a second focal power by concurrently applying overshoot control voltages to each of a plurality of the conductive electrodes for different, respective transition periods, followed by application of the control voltage waveforms corresponding to the second focal power.

6. The lens according to claim 5, wherein the transition periods comprise a plurality of time slots, and wherein the overshoot control voltages applied to at least some of the plurality of the conductive electrodes comprise at least a first overshoot voltage applied during a first time slot and a second overshoot voltage applied during a second time slot.

7. The lens according to claim 5, wherein the overshoot control voltages applied to at least some of the plurality of the conductive electrodes comprise a predefined high voltage, which is applied to different ones of the conductive electrodes for different, respective periods within the transition periods.

8. The lens according to claim 5, wherein the control circuitry is further configured, upon changing from the first focal power to the second focal power, to concurrently apply undershoot control voltages to at least some of the conductive electrodes before application of the second control voltage waveforms.

9. The lens according to claim 5, wherein when the second focal power is zero, the overshoot control voltages comprise a predefined high voltage, which is applied by the control circuitry to all of the conductive electrodes on the first side of the electro-optical layer, followed by application of a predefined low voltage in the second control voltage waveforms.

10. The lens according to claim 5, wherein the overshoot control voltages applied to at least one electrode among the plurality of the conductive electrodes depend both on the control voltage waveforms that are applied to the at least one electrode and on the control voltage waveforms that are applied to one or more other conductive electrodes that are adjacent to the at least one electrode.

11. Adaptive spectacles, comprising:
    a spectacle frame;
    first and second spectacle lenses according to claim 1, mounted in the spectacle frame and having respective focal powers and optical centers that are determined by the control voltage waveforms applied thereto;
    wherein the control circuitry is configured to apply the control voltage waveforms so as to shift the optical centers of the spectacle lenses responsively to the focal powers of the spectacle lenses.

12. The spectacles according to claim 11, wherein the control circuitry is configured to shift the optical centers of the first and second spectacle lenses downward when the focal powers of the spectacle lenses are increased.

13. The spectacles according to claim 11, wherein the control circuitry is configured to reduce a distance between the optical centers of the first and second spectacle lenses when the focal powers of the spectacle lenses are increased.

14. The lens according to claim 1, wherein to achieve a phase modulation profile φ(x) that is symmetrical about the central point (x=0), the control circuitry applies a control voltage waveform V(x) that is not symmetrical about the central point.

15. An optical method, comprising:
 positioning a spectacle lens in front of a human eye at a given distance from the eye so as to apply to rays of optical radiation that are incident on the eye through the spectacle lens a refractive phase modulation profile φ(x) as a function of a position x across the lens about a central point (x=0), whereby the rays that are incident on the eye at the given distance from the lens pass through the lens at respective angles of incidence α(x), wherein the lens comprises an electro-optical layer, having an effective local index of refraction at any given location within an active area of the electro-optical layer that is determined by a voltage waveform applied across the electro-optical layer at the location, and conductive electrodes disposed over opposing first and second side of the electro-optical layer; and
 applying control voltage waveforms V(x) between the conductive electrodes so as to generate the refractive phase modulation profile in the electro-optical layer to cause the rays of optical radiation that are incident on the lens to converge or diverge with a given focal power, while varying the control voltage waveforms for the given focal power as a function of the position x responsively to the angles of incidence α(x) of the rays that impinge on the lens at each position.

16. The method according to claim 15, wherein the electro-optical layer comprises a liquid crystal.

17. The method according to claim 15, wherein applying control voltage waveforms comprises:
 applying a control voltage waveform at a predetermined amplitude to produce a given phase shift in the rays that are incident along a normal to the lens;
 applying the control voltage waveform at a first amplitude, which is less than the predetermined amplitude, to produce the given phase shift in the rays that are incident at an acute angle to the method at a first azimuth; and
 applying the control voltage waveform at a second amplitude, which is greater than the predetermined amplitude, to produce the given phase shift in the rays that are incident at the acute angle to the method at a second azimuth, which is opposite to the first azimuth.

18. The method according to claim 15, wherein applying control voltage waveforms comprises varying the respective amplitudes of the control voltage waveforms over an area of the lens responsively to a mapping of the angle of incidence of the rays over the area of the lens.

19. The method according to claim 15, wherein applying control voltage waveforms comprises changing the lens from a first focal power to a second focal power by concurrently applying overshoot control voltages to each of a plurality of the conductive electrodes for different, respective transition periods, followed by application of the control voltage waveforms corresponding to the second focal power.

20. The method according to claim 19, wherein the transition periods comprise a plurality of time slots, and wherein applying the overshoot control voltages comprises applying to at least some of the plurality of the conductive electrodes at least a first overshoot voltage during a first time slot and a second overshoot voltage during a second time slot.

21. The method according to claim 19, wherein applying the overshoot control voltages comprises applying a predefined high voltage to different ones of the conductive electrodes for different, respective periods within the transition periods.

22. The method according to claim 19, and comprising, in preparation for changing from the first focal power to the second focal power, concurrently applying undershoot control voltages to at least some of the conductive electrodes before application of the second control voltage waveforms.

23. The method according to claim 19, wherein when the second focal power is zero, the overshoot control voltages comprise a predefined high voltage, which is applied to all of the conductive electrodes on the first side of the electro-optical layer, followed by application of a predefined low voltage in the second control voltage waveforms.

24. The method according to claim 19, wherein the overshoot control voltages applied to at least one electrode among the plurality of the conductive electrodes depend both on the control voltage waveforms that are applied to the at least one electrode and on the control voltage waveforms that are applied to one or more other conductive electrodes that are adjacent to the at least one electrode.

25. The method according to claim 15,
 wherein positioning the spectacle lens comprises providing spectacles including first and second electrically-tunable lenses mounted in a spectacle frame and having respective focal powers and optical centers that are determined by voltage waveforms applied thereto; and
 wherein applying the control voltage waveforms comprises receiving an input indicative of a distance from an eye of a person wearing the spectacles to an object viewed by the person; and
 responsively to the distance, automatically modifying the voltage waveforms so as both to tune the focal powers and to shift the optical centers of the electrically-tunable lenses.

26. The method according to claim 25, wherein automatically modifying the voltage waveforms comprises shifting the optical centers of the first and second electrically-tunable lenses downward when the distance is less than a predefined threshold distance.

27. The method according to claim 25, wherein automatically modifying the voltage waveforms comprises reducing a distance between the optical centers of the first and second electrically-tunable lenses when the distance is less than a predefined threshold distance.

28. The method according to claim 15,
 wherein positioning the spectacle lens comprises providing spectacles including first and second electrically-tunable lenses mounted in a spectacle frame and having respective focal powers and optical centers that are determined by voltage waveforms applied thereto; and
 wherein applying the control voltage waveforms comprises applying the control voltage waveforms so as to shift the optical centers of the electrically-tunable lenses responsively to the focal powers of the electrically-tunable lenses.

29. The method according to claim 28, wherein applying control voltage waveforms comprises shifting the optical centers of the first and second electrically-tunable lenses downward when the focal powers of the electrically-tunable lenses are increased.

30. The method according to claim 28, wherein applying control voltage waveforms comprises reducing a distance between the optical centers of the first and second electrically-tunable lenses when the focal powers of the electrically-tunable lenses are increased.

31. The method according to claim 15, wherein applying the control voltage waveforms comprises applying a control voltage waveform $V(x)$ that is not symmetrical about the central point ($x=0$) to achieve a phase modulation profile $\phi(x)$ that is symmetrical about the central point.

* * * * *